US008504652B2

(12) United States Patent
Rothschild

(10) Patent No.: US 8,504,652 B2
(45) Date of Patent: Aug. 6, 2013

(54) METHOD AND SYSTEM FOR SELECTIVELY SUPPLYING MEDIA CONTENT TO A USER AND MEDIA STORAGE DEVICE FOR USE THEREIN

(75) Inventor: Leigh M. Rothschild, Plantation, FL (US)

(73) Assignee: Portulim Foundation LLC, Wilmington, DE (US)

( * ) Notice: Subject to any disclaimer, the term of this patent is extended or adjusted under 35 U.S.C. 154(b) by 1013 days.

(21) Appl. No.: 11/400,889

(22) Filed: Apr. 10, 2006

(65) Prior Publication Data

US 2007/0250573 A1 Oct. 25, 2007

(51) Int. Cl.
*G06F 15/16* (2006.01)

(52) U.S. Cl.
USPC ............................... 709/219; 715/201; 726/27

(58) Field of Classification Search
USPC .......................................................... 709/219
See application file for complete search history.

(56) References Cited

U.S. PATENT DOCUMENTS

| 4,641,253 | A | 2/1987 | Mastran |
| 4,785,472 | A | 11/1988 | Shapiro |
| 5,087,980 | A | 2/1992 | Staffer |
| 5,119,474 | A | 6/1992 | Beitel et al. |
| 5,274,758 | A | 12/1993 | Beitel et al. |
| 5,365,579 | A | 11/1994 | Hendrickson |
| 5,394,548 | A | 2/1995 | Nakajima et al. |
| 5,404,437 | A | 4/1995 | Nguyen |
| 5,430,835 | A | 7/1995 | Williams et al. |
| 5,440,677 | A | 8/1995 | Case et al. |
| 5,467,288 | A | 11/1995 | Fasciano et al. |
| 5,479,268 | A | 12/1995 | Young et al. |
| 5,553,221 | A | 9/1996 | Reimer et al. |
| 5,559,949 | A | 9/1996 | Reimer et al. |
| 5,583,980 | A | 12/1996 | Anderson |
| 5,596,705 | A | 1/1997 | Reimer et al. |
| 5,624,265 | A | 4/1997 | Redford et al. |
| 5,640,560 | A | 6/1997 | Smith |
| 5,642,477 | A | 6/1997 | De Carmo et al. |
| 5,675,511 | A | 10/1997 | Prasad et al. |
| 5,696,905 | A | 12/1997 | Reimer et al. |

(Continued)

FOREIGN PATENT DOCUMENTS

| WO | WO-99/26415 | 5/1999 |
| WO | WO-02/15024 | 2/2002 |

OTHER PUBLICATIONS

Final Office Action issued in U.S. Appl. No. 11/527,279 and mailed Jun. 21, 2010.

(Continued)

*Primary Examiner* — Hamza Algibhah

(57) ABSTRACT

A method and system for selectively supplying media content to a user includes a first media storage device acquired by the user from a media content provider. The storage device includes first media content and information related to second media content, both of which are preferably accessible from the storage device immediately upon acquisition. After the user has reviewed the storage device's contents, the content provider receives a request from the user (e.g., at a website server) to obtain the second media content. Responsive to the request, the content provider selectively provides the user electronic access to the second media content without providing the user a second media storage device. For example, the content provider may provide the user an access code that allows the user to unlock the second media content from the first media storage device, which content was preferably pre-stored thereon in encrypted or another locked form.

31 Claims, 7 Drawing Sheets

U.S. PATENT DOCUMENTS

| | | | |
|---|---|---|---|
| 5,715,400 | A | 2/1998 | Reimer et al. |
| 5,758,093 | A | 5/1998 | Boezeman et al. |
| 5,781,730 | A | 7/1998 | Reimer et al. |
| 5,808,662 | A | 9/1998 | Kinney et al. |
| 5,861,881 | A | 1/1999 | Freeman et al. |
| 5,898,429 | A | 4/1999 | Trom et al. |
| 5,973,679 | A | 10/1999 | Abbott et al. |
| 5,987,525 | A | 11/1999 | Roberts et al. |
| 6,006,241 | A | 12/1999 | Purnaveja et al. |
| 6,065,042 | A | 5/2000 | Reimer et al. |
| 6,094,671 | A | 7/2000 | Chase et al. |
| 6,118,445 | A | 9/2000 | Nonomura et al. |
| 6,122,658 | A | 9/2000 | Chaddha |
| 6,173,317 | B1 | 1/2001 | Chaddha et al. |
| 6,226,655 | B1 | 5/2001 | Borman et al. |
| 6,230,172 | B1 | 5/2001 | Purnaveja et al. |
| 6,230,207 | B1 | 5/2001 | Roberts et al. |
| 6,239,801 | B1 | 5/2001 | Chiu et al. |
| 6,240,459 | B1 | 5/2001 | Roberts et al. |
| 6,240,555 | B1 | 5/2001 | Shoff et al. |
| 6,337,947 | B1 | 1/2002 | Porter et al. |
| 6,438,751 | B1 | 8/2002 | Voyticky et al. |
| 6,490,580 | B1 | 12/2002 | Dey et al. |
| 6,519,771 | B1 | 2/2003 | Zenith |
| 6,529,949 | B1 | 3/2003 | Getsin et al. |
| 6,571,392 | B1 | 5/2003 | Zigmond et al. |
| 6,580,870 | B1 | 6/2003 | Kanazawa et al. |
| 6,678,866 | B1 | 1/2004 | Sugimoto et al. |
| 6,757,482 | B1 | 6/2004 | Ochiai et al. |
| 6,857,130 | B2 | 2/2005 | Srikantan et al. |
| 6,941,383 | B1 | 9/2005 | Getsin et al. |
| 6,944,621 | B1 | 9/2005 | Collart |
| 6,976,265 | B1 | 12/2005 | Yang et al. |
| 7,058,889 | B2 | 6/2006 | Trovato et al. |
| 7,103,908 | B2 | 9/2006 | Tomsen |
| 7,120,924 | B1 | 10/2006 | Katcher et al. |
| 7,136,571 | B1 | 11/2006 | Dagtas |
| 7,143,428 | B1 | 11/2006 | Bruck et al. |
| 7,219,173 | B2 | 5/2007 | Sha et al. |
| 7,254,779 | B1 | 8/2007 | Rezvani et al. |
| 7,428,504 | B2 | 9/2008 | Song |
| 7,434,154 | B2 | 10/2008 | Konetski |
| 7,464,172 | B2 | 12/2008 | Deshpande |
| 2001/0001865 | A1 | 5/2001 | Barraclough et al. |
| 2001/0005446 | A1 | 6/2001 | Uchikoga |
| 2001/0013068 | A1 | 8/2001 | Klemets et al. |
| 2001/0044726 | A1 | 11/2001 | Li et al. |
| 2002/0016820 | A1 | 2/2002 | Du Val et al. |
| 2002/0046083 | A1 | 4/2002 | Ondeck |
| 2002/0053083 | A1 | 5/2002 | Massey |
| 2002/0053089 | A1 | 5/2002 | Massey |
| 2002/0059342 | A1 | 5/2002 | Gupta et al. |
| 2002/0077988 | A1 | 6/2002 | Sasaki et al. |
| 2002/0078144 | A1 | 6/2002 | Lamkin et al. |
| 2002/0078456 | A1 | 6/2002 | Hudson et al. |
| 2002/0087569 | A1 | 7/2002 | Fischer et al. |
| 2002/0089519 | A1 | 7/2002 | Betz et al. |
| 2002/0090201 | A1 | 7/2002 | Betz et al. |
| 2002/0091658 | A1 | 7/2002 | Bae |
| 2002/0091762 | A1 | 7/2002 | Sohn et al. |
| 2002/0106188 | A1 | 8/2002 | Crop et al. |
| 2002/0106191 | A1 | 8/2002 | Betz et al. |
| 2002/0116707 | A1 | 8/2002 | Morris et al. |
| 2002/0116708 | A1 | 8/2002 | Morris et al. |
| 2002/0120925 | A1 | 8/2002 | Logan |
| 2002/0131511 | A1 | 9/2002 | Zenoni |
| 2002/0152233 | A1 | 10/2002 | Cheong et al. |
| 2002/0161462 | A1 | 10/2002 | Fay et al. |
| 2002/0161797 | A1 | 10/2002 | Gallo et al. |
| 2002/0163533 | A1 | 11/2002 | Trovato et al. |
| 2002/0173273 | A1 | 11/2002 | Spurgat et al. |
| 2002/0180803 | A1 | 12/2002 | Kaplan et al. |
| 2003/0002849 | A1 | 1/2003 | Lord |
| 2003/0009485 | A1 | 1/2003 | Turner |
| 2003/0018609 | A1 | 1/2003 | Phillips et al. |
| 2003/0026587 | A1 | 2/2003 | Ostrover |
| 2003/0035646 | A1 | 2/2003 | Salvatori et al. |
| 2003/0070181 | A1 | 4/2003 | Holm |
| 2003/0113096 | A1 | 6/2003 | Taira et al. |
| 2003/0115598 | A1 | 6/2003 | Pantoja |
| 2003/0140090 | A1 | 7/2003 | Rezvani et al. |
| 2003/0152366 | A1 | 8/2003 | Kanazawa et al. |
| 2003/0188255 | A1 | 10/2003 | Shimizu et al. |
| 2003/0191816 | A1 | 10/2003 | Landress et al. |
| 2003/0216922 | A1 | 11/2003 | Gonzales et al. |
| 2003/0217363 | A1 | 11/2003 | Brady et al. |
| 2004/0054542 | A1 | 3/2004 | Foote et al. |
| 2004/0205830 | A1 | 10/2004 | Kaneko |
| 2004/0261127 | A1 | 12/2004 | Freeman et al. |
| 2005/0015815 | A1 | 1/2005 | Shoff et al. |
| 2005/0028195 | A1 | 2/2005 | Feinleib et al. |
| 2005/0058435 | A1 | 3/2005 | Chung et al. |
| 2005/0070361 | A1 | 3/2005 | Lau et al. |
| 2005/0086069 | A1 | 4/2005 | Watson et al. |
| 2005/0108026 | A1 | 5/2005 | Brierre et al. |
| 2005/0117886 | A1 | 6/2005 | Kang et al. |
| 2005/0152683 | A1 | 7/2005 | Ryu |
| 2005/0182828 | A1 | 8/2005 | Lamkin et al. |
| 2005/0185929 | A1 | 8/2005 | Kang et al. |
| 2005/0193322 | A1 | 9/2005 | Lamkin et al. |
| 2005/0198574 | A1 | 9/2005 | Lamkin et al. |
| 2005/0251749 | A1 | 11/2005 | Lamkin et al. |
| 2005/0265701 | A1 | 12/2005 | Lamkin et al. |
| 2005/0278435 | A1 | 12/2005 | Lamkin et al. |
| 2005/0278729 | A1 | 12/2005 | Lamkin et al. |
| 2006/0041639 | A1 | 2/2006 | Lamkin et al. |
| 2006/0041640 | A1 | 2/2006 | Lamkin et al. |
| 2006/0077773 | A1 | 4/2006 | Seo et al. |
| 2006/0143559 | A1 | 6/2006 | Spielberg et al. |
| 2006/0257916 | A1 | 11/2006 | Hashmi et al. |
| 2006/0259469 | A1 | 11/2006 | Chiu |
| 2006/0277454 | A1 | 12/2006 | Chen |
| 2006/0287916 | A1 | 12/2006 | Starr et al. |
| 2007/0067707 | A1 | 3/2007 | Travis et al. |
| 2007/0160343 | A1 | 7/2007 | Sugimoto et al. |
| 2007/0168543 | A1 | 7/2007 | Krikorian et al. |
| 2007/0180387 | A1 | 8/2007 | Gravina et al. |
| 2007/0198632 | A1 | 8/2007 | Peart et al. |
| 2008/0046925 | A1 | 2/2008 | Lee et al. |
| 2008/0046956 | A1 | 2/2008 | Kulas |
| 2008/0270570 | A1 | 10/2008 | Reed |
| 2008/0279535 | A1 | 11/2008 | Haque et al. |
| 2009/0259633 | A1 | 10/2009 | Bronstein et al. |
| 2010/0115575 | A1 | 5/2010 | Yu et al. |

OTHER PUBLICATIONS

Final Office Action issued in U.S. Appl. No. 11/652,436 and mailed on Oct. 20, 2009.
Non-final Office Action issued in U.S. Appl. No. 11/527,279 and mailed on Oct. 5, 2009.
Non-final Office Action issued in U.S. Appl. No. 11/652,436 and mailed Jun. 17, 2010.
Non-final Office Action issued in U.S. Appl. No. 11/652,436 and mailed on Mar. 6, 2009.
Non-final Office Action issued in U.S. Appl. No. 11/716,763 and mailed on Sep. 22, 2009.
Non-final Office Action issued in U.S. Appl. No. 12/380,701 and mailed on Dec. 1, 2009.
Notice of Allowance issued in U.S. Appl. No. 12/380,701 and mailed on Jun. 16, 2010.
Restriction Requirement issued in U.S. Appl. No. 11/716,763 and mailed on Jun. 29, 2009.
US Notice of Allowance issued in U.S. Appl. No. 11/716,763 and mailed Jun. 24, 2010.
Non-final Office Action issued in U.S. Appl. No. 12/380,701 and mailed on Mar. 18, 2010.
Non-final Office Action issued in U.S. Appl. No. 10/034,832 and mailed on Feb. 22, 2007.
Final Office Action issued in U.S. Appl. No. 10/034,832 and mailed on Jul. 19, 2007.
Advisory Action issued in U.S. Appl. No. 10/034,832 and mailed on Oct. 12, 2007.
Non-final Office Action issued in U.S. Appl. No. 10/034,832 and mailed on Jan. 16, 2008.

Non-final Office Action issued in U.S. Appl. No. 10/034,832 and mailed on Jul. 21, 2008.
Notice of Allowance issued in U.S. Appl. No. 10/034,832 and mailed on Jan. 14, 2009.
Restriction Requirement issued in U.S. Appl. No. 09/997,477 and mailed on Jun. 6, 2007.
Non-final Office Action issued in U.S. Appl. No. 09/997,477 and mailed on Oct. 3, 2007.
Final Office Action issued in U.S. Appl. No. 09/997,477 and mailed on Mar. 27, 2008.
Advisory Action issued in U.S. Appl. No. 09/997,477 and mailed on Jun. 12, 2008.
Non-final Office Action issued in U.S. Appl. No. 09/997,477 and mailed on Sep. 18, 2008.
Final Office Action issued in U.S. Appl. No. 09/997,477 and mailed on Apr. 27, 2009.
Advisory Action issued in U.S. Appl. No. 09/997,477 and mailed on Jul. 6, 2009.
Non-final Office Action issued in U.S. Appl. No. 09/997,477 and mailed on Sep. 29, 2009.
Notice of Allowance issued in U.S. Appl. No. 09/997,477 and mailed on Mar. 10, 2010.
Final Office Action issued in U.S. Appl. No. 11/652,436 and mailed on Oct. 19, 2010.
Non-final Office Action issued in U.S. Appl. No. 12/771,004 and mailed on Dec. 6, 2010.
Notice of Allowance issued in U.S. Appl. No. 11/716,763 and mailed on Nov. 24, 2010.
Final Office Action issued in U.S. Appl. No. 11/652,436 and mailed Jul. 13, 2011.
Notice of Allowance issued in U.S. Appl. No. 12/380,701 and mailed Jun. 10, 2011.
Final Office Action issued in U.S. Appl. No. 12/771,004 and mailed on May 5, 2011.
Non-final Office Action issued in U.S. Appl. No. 11/652,436 and mailed Apr. 12, 2011.
Non-final Office Action issued in U.S. Appl. No. 12/780,236 and mailed Mar. 30, 2011.
Non-Final Office Action on U.S. Appl. No. 11/527,279, mailed Feb. 13, 2013.
Non-final Office Action issued in U.S. Appl. No. 11/716,763 and mailed Mar. 15, 2012.
Final Office Action on U.S. Appl. No. 11/716,763, mailed Jul. 3, 2012.
Non-Final Office Action on U.S. Appl. No. 11/527,279, mailed Jul. 12, 2012.
Notice of Allowance on U.S. Appl. No. 11/652,436, mailed Oct. 26, 2011.
Final Office Action issued in U.S. Appl. No. 12/780,236 and mailed Aug. 31, 2011.
Final Office Action on U.S. Appl. No. 11/527,279, mailed Nov. 27, 2012.
Notice of Allowance on U.S. Appl. No. 12/771,004, mailed Sep. 14, 2012.
Non-Final Office Action on U.S. Appl. No. 11/716763, mailed May 23, 2013.

METHOD AND SYSTEM FOR SELECTIVELY SUPPLYING MEDIA CONTENT TO A USER AND MEDIA STORAGE DEVICE FOR USE THEREIN

BACKGROUND

1. Field

The present disclosure relates generally to the supply and acquisition of movies, music, and other media content and, in particular, to a method and system for selectively supplying supplemental media content to users purchasing or otherwise legally acquiring primary media content without requiring the users to acquire additional storage media from media content providers containing the supplemental media content.

2. Current Relevant Art

Portable media storage devices for storing digital content are widely used to enjoy audio and/or video program materials. Examples of such devices include compact disc (CDs) and digital versatile or video discs (DVDs). CDs and DVDs are fabricated in several forms. For example, CDs may be single-sided, dual-sided, high density (HDCD), super audio (SACD), super video (SVCD), readable, writable, and/or recordable, or capable of storing and playing audio files that are compatible with different operating systems (e.g., a hybrid CD). CDs are also able to store and play various file types, such as .mp3 files, .wav files, .au files, .ram files, and .wma files, just to name a few. Similarly, DVDs may be single-sided, dual-sided, high density, high definition, readable, writable, and/or recordable, single layer, or multi-layer. DVDs are also able to store and play various file types, such as PAL, NTSC and/or MPEG files. Additional types of portable digital storage devices, such as a memory sticks, secure digital cards (SDCs), CompactFlash cards, and microdrives, presently exist in connection with digital photography. However, industry professionals envision that such devices may, over time, be adapted for use in connection with audio and/or video materials. Further, various new types of portable storage devices are being created on a regular basis.

Portable storage devices are limited as to the amount of audio and/or video content that can be stored. For example, a conventional audio CD can typically hold between 600 and 700 Megabytes (Mb) of data. A standard DVD can hold between 4.7 and 9.4 Gigabytes (Gb) of data depending on the layering employed. However, a typical high definition DVD can generally hold more than 20 Gb of data. Thus, the storage capabilities of portable storage devices are rapidly expanding, rendering such devices capable of storing more content than the primary content of the device. For example, DVDs often include not only the movie advertised on the DVD's cover, but also so-called "bonus material", such as games, bloopers, documentaries on the making of the films, and other material. With the continual growth in the storage capabilities of the portable storage devices, such devices will inevitably, if they are not already, be capable of storing multiple movies, albums and other content. Thus, entertainment publishers may soon be able to provide multiple media works (e.g., movies or albums) to consumers on a single CD or DVD. While consumers may welcome the ability to reduce the sizes of their CD and DVD collections without sacrificing content, they may not be so receptive to being required to purchase multiple movies or albums each time they are inclined to make a purchase. Thus, requiring consumers to purchase sets of digital media content at the point of sale of the CD or DVD is not an optimal solution.

Therefore, a need exists for a method and system for selectively supplying media content to users that enable consumers purchasing or otherwise legally acquiring primary media content to expediently acquire supplemental media content without having to increase the sizes of their DVD and CD collections to do so. Such a system and method that provides all content in a secure manner to counter or at least mitigate the likelihood of illegal piracy of the content, which piracy costs the entertainment industry billions of dollars each year, would be a further improvement over the prior art.

SUMMARY

According to one aspect of the present disclosure, a method for supplying media content to a user is provided. The method including the steps providing the user a first media storage device, the first media storage device including first media content and information relating to second media content, the first media content being accessible by the user from the first media storage device; receiving a request from the user to obtain the second media content; and responsive to the request, selectively providing the user electronic access to the second media content without providing the user a second media storage device. The method further provides wherein the second media content is prestored on the first media storage device and wherein the step of selectively providing the user electronic access to the second media content includes electronically transmitting a code to a processing device operated by the user, the code enabling the processing device to access the second media content. The code includes at least one of an encryption key, a password, a passcode and a software application. In one embodiment, the software application enables the processing device to read the second media content from the first media storage device and restore the second media content on the first media storage device so as to facilitate subsequent access to the second media content by at least one of the processing device and a second processing device. In another embodiment, the software application enables the processing device to read the second media content from the first media storage device and store the second media content on a second media storage device so as to facilitate subsequent access to the second media content by at least one of the processing device and a second processing device.

In a further aspect of the method, the second media content is prestored on the first media storage device and wherein the step of selectively providing the user electronic access to the second media content includes receiving consideration from the user for the second media content; and responsive to receiving the consideration, electronically transmitting the second media content to a processing device operated by the user. The consideration includes at least payment of a purchase price of the second media content or personal information of the user, wherein the personal information may include at least one of demographic information and psychographic information.

In another aspect, the second media content includes digital rights management software to mitigate unauthorized duplication of the second media content after electronic access thereto has been obtained by the user.

In still a further aspect of the present disclosure, a method for storing media content on a portable storage device is provided. The method includes the steps storing first media content in a first portion of the portable storage device, the first media content being freely accessible upon acquisition of the portable media storage device; encrypting at least a portion of second media content to produce encrypted content;

and storing the encrypted content in a second portion of the portable storage device, the encrypted content remaining inaccessible until application of an access code.

In a further aspect, a method for acquiring media content includes acquiring a first media storage device that includes first media content and information relating to second media content; reviewing the information related to the second media content; requesting access to the second media content; and receiving electronic access to the second media content without having to obtain a second media storage device having the second media content stored thereon.

According to still another aspect, a system for supplying media content to a user includes a first media storage device that includes first media content and information relating to second media content, the first media content and the information related to the second media content being accessible by the user from the first media storage device; and a server accessible over a wide area network that selectively provides the user electronic access to the second media content without necessitating acquisition of a second media storage device having the second media content stored thereon, wherein the second media content is stored in locked form on the first media storage device and the second media content becomes accessible by the user upon issuance of a code by the server.

According to another aspect of the present disclosure, a media storage device includes first media content that is freely accessible to a user upon acquisition of the media storage device; and second media content that is accessible to the user only upon use of an access code. The access code includes at least one of an encryption key, a password, a passcode, and a software application acquired from a provider of at least the second media content. The second media content comprises a plurality of data files, wherein a portion of the plurality of data files are encrypted. The plurality of data files includes content files and menu files, and wherein the portion of the plurality of data files that are encrypted comprises at least the content files and/or the menu files.

DETAILED DESCRIPTION

Generally, the present disclosure encompasses a method and system for selectively supplying media content to a user that has directly or indirectly acquired a first media storage device, such as a CD or DVD, from a media content provider (e.g., a music or movie publisher, distributor, or retailer). The first media storage device includes first media content (e.g., a movie or a music album) and information related to second media content (e.g., a movie trailer, a music sample, or general advertising together with the uniform resource locator (URL) or Internet Protocol (IP) address of a website at which the user may purchase the second media content), both of which are preferably accessible from the first media storage device immediately upon acquisition of the device. Some time after the user acquires the first media storage device, the media content provider receives a request from the user (e.g., at the media content provider's website) to obtain the second media content. Responsive to the request, the media content provider selectively provides the user electronic access to the second media content without providing the user a second media storage device. For example, upon receiving payment information from the user at the website, the media content provider may permit the user to download the second media content (e.g., movie or music album) from the website for storage on the user's computer hard drive or other storage device. Alternatively, the media content provider may provide the user an appropriate code (e.g., a small software application, such as a JAVA applet or cookie, together with an encryption key) that allows the user to access the second media content from the first media storage device. In this latter case, the second media content may be prestored in encrypted or other locked form on a portion of the first media storage device and the code supplied by the media content provider decrypts or otherwise unlocks the second media content to permit use thereof by the user. 100211 By selectively supplying media content in this manner, the present disclosure enables media content providers to more readily supply users with media content responsive to the impulsive needs of their customers, while mitigating the likelihood that unauthorized copies of the content will be obtained and distributed. In addition, the present disclosure enables media content providers to take advantage of the increasing data storage capacities of current and future portable media storage devices to prestore various content on a single device, while limiting access to the content until appropriate payment has been received.

Figure 1:
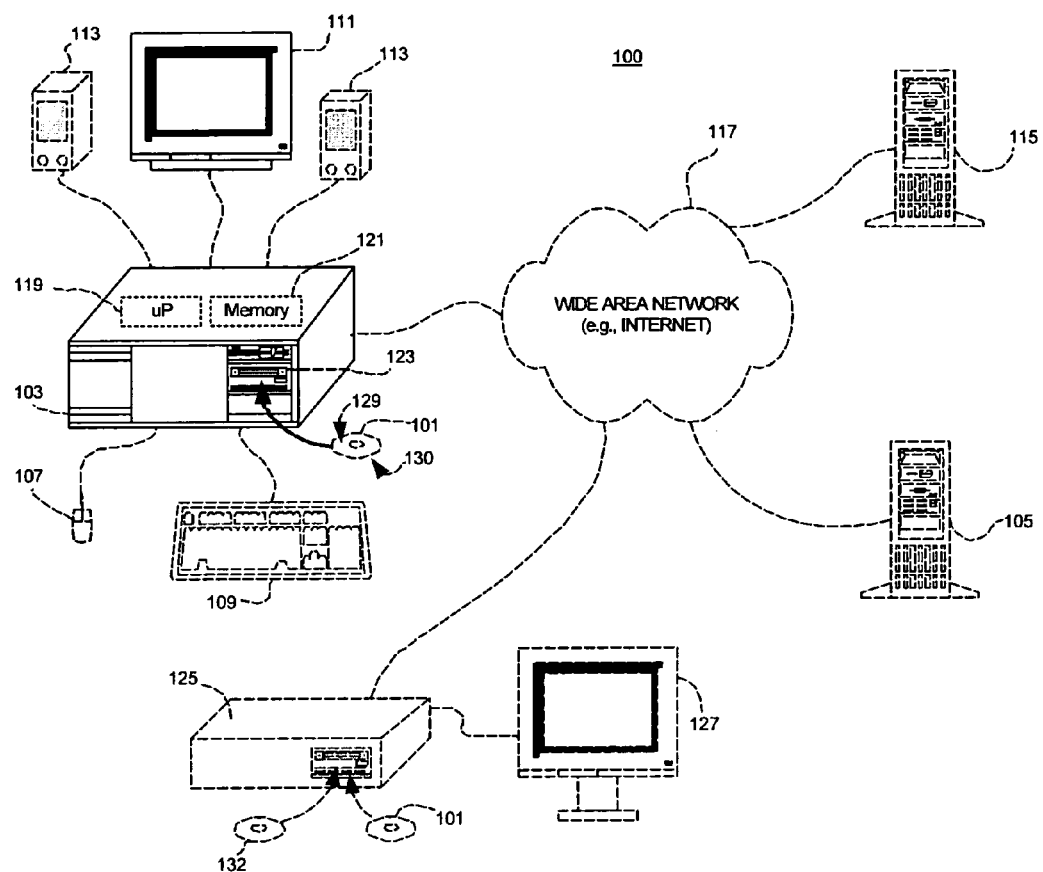
FIG. 1 is a block diagram of an exemplary system for selectively supplying media content to a user in accordance with the present disclosure.

The present disclosure can be more fully understood with reference to FIGS. 1-8, in which like reference numerals designate like items. FIG. 1 is a block diagram of an exemplary system 100 for selectively supplying media content to a user in accordance with the present disclosure. The system 100 preferably includes at least one media storage device 101, 132, which device is preferably portable or removable, at least one processing device 103, 125, and at least one server 105, 115. The system 100 may further include one or more user input devices, such as a mouse 107, a keyboard, 109, a touchpad, a touchscreen, or a microphone (e.g., where the processing device 103 executes voice recognition software and is capable of responding to voice instructions), one or more video display devices 111, 127, such as a computer monitor, a plasma or liquid crystal display, or a television, and/or one or more standalone or embedded audio output devices 113, such as speakers. At least one of the processing devices 103, 125 is appropriately coupled to a wide area network 117, such as the Internet, thereby facilitating communications between the processing device 103, 125 and the remote server(s) 105, 115 in accordance with conventional Internet Protocol (IP) data transfer technology.

Processing device 103 preferably comprises any form of computer or other device that executes instructions stored in memory to perform various tasks and that is capable of accessing the wide area network 117. Thus, processing device 103 may be a laptop computer, notebook computer, desktop computer, personal digital assistant (PDA), game console system, cellular telephone, portable or handheld gaming system, or a media player (e.g., a CD player, a DVD player, or an MP3 player). Processing device 103 includes, inter alia, one or more processors 119 (one shown), various forms of memory 121, and one or more drives 123 (one shown) for receiving, reading from, and/or writing to a media storage device 101, 132 inserted therein. While the drive 123 depicted in processing device 103 is a CD/DVD drive, the processing device 103 may further include applicable drives to read various other forms of portable or removable media storage devices, such as memory sticks, SDCs, CompactFlash cards, and microdrives. In addition, while the drive 123 depicted in processing device 103 is integrated into the processing device's housing, such drive 123 may alternatively be external to the processing device 103 and coupled thereto via a cable, such as a Universal Serial Bus (USB) cable. Therefore, as a used herein, the term "media storage device" means any article for storing digital content and its accompanying packaging materials. The media storage device 101 may be a portable or removable device, including, but not limited to, any form or type of CD, DVD, memory stick, SDC, CompactFlash card, or microdrive.

Processing device 125 preferably comprises a standalone CD player, DVD player, MP3 player, or other media player, or any device that includes such a player, including, without limitation, a TV set top box, a high definition receiver, or a multi-function jukebox player. Depending upon system implementation, processing device 125 may include appropriate software to couple to and exchange information over the wide area network 117.

While the interconnections of the various system components are illustrated in FIG. 1 as being via cables, one of ordinary skill in the art will readily appreciate that such connections may be wireless instead using any one or more of a variety of commercially available wireless protocols, such as Bluetooth for short range interconnections and wireless local area network (WLAN) protocols (e.g., IEEE 802.11a/b/g) for longer range interconnections. Additionally, where the processing device 103 is itself portable (e.g., a PDA, a wireless telephone, or a wireless media player), the interconnection from the processing device 103 to the wide area network 117 is preferably wireless using an appropriate wide area wireless protocol, such as any of the commercially available cellular telephone, personal communication system, or wireless packet data (including WLAN) protocols. One of ordinary skill will further recognize that additional devices, although not depicted in FIG. 1 for the sake of clarity, may be included in the system 100 to facilitate access to and information exchange over the wide area network 117. Such devices include, but are not limited to, gateways, routers, hubs, and modems (e.g., dial-up, digital subscriber line (DSL) or cable modems).

Figure 2:
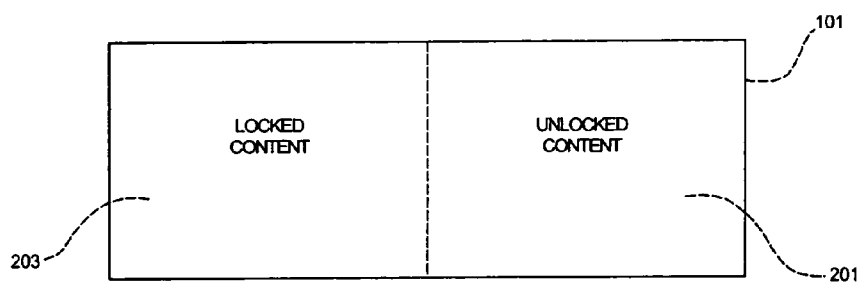
FIG. 2 is a block diagram generally illustrating the inclusion of locked and unlocked content on a media storage device in accordance with a preferred embodiment of the present disclosure.

Referring now to FIGS. 1 and 2, operation of the system 100 occurs substantially as follows in accordance with various embodiments of the present disclosure. The publisher of certain media content preferably masters and stores primary content and information relating to additional content in or on one portion of a media storage device (e.g., device 101). In a preferred embodiment, the publisher also stores the additional content in or on another portion of the media storage device 101. However, prior to storing the additional content, the publisher preferably encrypts at least some of the additional content using conventional data encryption algorithms and/or optionally a standalone encryption module. Such conventional encryption algorithms include, but are not limited to, those based on the data encryption standard (DES) algorithm and/or the advanced encryption standard (AES), including, without limitation, the Triple-DES algorithm, the Blowfish algorithm, the Twofish algorithm, and the CAST-256 algorithm, just to name a few.

When stored on the same media storage device 101 as is the primary content, the additional content may be embodied in several independent, linked files including, for example, content files (e.g., in DVDs, these files may be .vob, .dvr-ms, .wmv, or .avi file types, and in audio CDs these files may be .mp3 or .wma file types) and menu and interface files (e.g., in DVDs, these files may be .ifo and bup files). The files may be encrypted individually or as a group, such as through the use of PRETTY GOOD PRIVACY (PGP) encryption software that is commercially available from PGP Corporation of Palo Alto, Calif., such that all of the files become readable when the encrypted structure is properly accessed (e.g., through application or use of an appropriate encryption key). For example, when the media storage device 101 is capable of storing data on both sides 129, 130 of the device 101, the publisher may store the primary content and information relating to the additional content (e.g., movie trailer, music sample, or other advertising information) on one side 129 of the device 101 and store the additional content in an encrypted or other locked form on the other side 130 of the device 101. Furthermore, both the primary and additional content may include digital rights management software to mitigate unauthorized duplication of the primary and/or additional media content.

Some time after the media storage device 101 has been fabricated to include the primary, unlocked content 201 and the additional or supplemental, locked content 203, a user may obtain the media storage device 101 (e.g., by purchasing it or otherwise receiving it through an appropriate distribution channel) and play or otherwise review the portion (e.g., side 129) of the device 101 that includes the primary, unlocked content 201 and the information relating to the additional, locked content 203 in any processing device 101, 125 (e.g., computer, DVD player, CD player, MP3 player, game console, etc.) capable of playing content from the particular type of media storage device 101. The information relating to the locked content 203 preferably comprises a preview of the locked content 203 (e.g., a movie trailer or a music sample). Alternatively, the information relating to the locked content 203 may comprise a series of individual video frames or a website URL that is included on the packaging of the media storage device 101. In this case, the information relating to the locked content 203 need not form part of the content that is digitally stored in or on the media storage device 101.

After reviewing the information relating to the locked content 203, the user can decide whether to request access to the locked content 203. If the user decides to request access to the locked content 203, the user preferably places the media storage device 101 into an appropriate drive 123 of processing device 103, which processing device 103 is preferably connected to the wide area network 117 (e.g., the Internet). When the unlocked content 201 and the locked content 203 are stored on opposite sides of the media storage device 101, the user may need to flip the media storage device 101 over before placing it in the drive 123 depending on whether the drive 123 can read both sides of the device 101 and whether the information necessary to request access to the locked content 203 is stored on the back side 130 of the device 101.

Upon reading the media storage device 101, the processing device 103 may be automatically directed to a server (e.g., 105) coupled to the wide area network 117 to access the locked content 203 or may execute software on the device 101 that provides locked content access information to the user via one or more of the video display device 111 and the audio output device 113. In the latter case, the software on the media storage device 101 may urge the user to access a website of the media content provider to obtain access to the locked content 203 and may further provide a hyperlink to the website, which is preferably hosted on the server 105. If the user desires access to the locked content 203, the user operates the processing device 103 to select the hyperlink.

After the user selects the hyperlink or the processing device 103 is automatically directed to the server 105, the server software preferably initiates a routine that requires the user to enter payment information (e.g., credit card information) and/or other information requested by the media content provider or the website operator to enable the media content provider to authorize user access to the locked content 203. Alternatively, selection of the hyperlink or automatic direction may simply provide the user access to a home page or other location on the media content provider's website. In this case, the user may use an input device 107 to select the appropriate link associated with requesting access to the locked content 203. It is to be appreciated that the media content provider may accept consideration other than a payment price for unlocking the content. For example, the media content provider may accept personal information, demographic information and psychographic information provided by a user instead of a payment for the additional media content After receiving and, if necessary, validating all supplied information, the server 105 or another server 115 (e.g., where payment and validation are performed by one server 105 (e.g., operated by a payment authorization service) and access to the locked content 203 is provided by another server 115 (e.g., operated by the media content provider)) supplies necessary information to the processing device 103 via the wide area network 117 to enable the processing device 103 to access the locked content 203. In a preferred embodiment, the server 105, 115 provides a code to the processing device 203 to facilitate access to the locked content 203. The code may be an encryption key, password, passcode, software application (e.g., a decryption algorithm embodied in an applet or cookie), or any other electronic means for unlocking the locked content 203. Upon receiving the code from the server 105, 115, the processing device 103 may use standard software and computer processing power to unlock the locked content 203 (e.g., decode or decrypt the files constituting the locked content 203) and copy the unlocked files from the media storage device 101 into the processing device's memory 121, which may comprise an internal hard drive or any other form of internal or external memory. The user may then play back the new content with any commercially available media player (e.g., Apple's ITUNES, Microsoft's WINDOWS MEDIA PLAYER, or RealNetworks's REALPLAYER). It is to be appreciated that the additional media content may includes digital rights management software to mitigate unauthorized duplication of the new media content after access has obtained through use of the code.

In an alternative embodiment in which the user desires to play the newly unlocked content on a standalone playback device 125, such as a commercially available fixed or portable CD, DVD or other player, the user may instruct the processing device 103 to restore/write the content in unlocked form back onto the media storage device 101. However, such restoring of the additional content can only occur on a device 101 that has not been finalized. Devices 101 that may be finalized after purchase include, but are not limited to, CD-R, DVD-R, DVD+R, and DVD RAM media. In this case, the processing device 103 transfers the decoded files from memory 121 onto or into the media storage device 101 using commercially available writing software, such as NERO CD burning software from Nero, Inc. of Glendale, Calif. and RECORDNOW! CD and DVD burning software from Sonic Solutions, Inc. of Novato, Calif. An alternative system and method for selectively accessing or utilizing auxiliary data stored on a portable storage device is disclosed in commonly-owned U.S. Pat. No. 6,101,534, which patent is incorporated herein by this reference.

Alternatively, instead of restoring the newly unlocked content onto the media storage device 101, the code received from the server 105 may enable the processing device 103 to permanently disable the security features associated with the locked content 203, thereby permitting the previously locked content to be read by the processing device 103 or a standalone media player 125.

In yet another embodiment of the present disclosure, if the original media storage device 101 is not writeable and the user wishes to playback the newly unlocked/decrypted media content in a standalone playback device 125, the server 105, 115 may instruct the user to place a commercially available, writeable storage device (e.g., device 132) into the appropriate drive 123 of the processing device 103. Any writeable media storage device may be used so long as the user selects a storage device with sufficient capacity to store the newly unlocked content and a driver capable of handling the data transfer. Once the writeable media storage device 132 has been inserted into the drive 123, the processing device 103 transfers the decoded/unlocked files from the processing device's memory 121 to the writeable media storage device 132. In the event that the user desires to have both the original unlocked content 201 and the newly unlocked content on the same media storage device 132, the user may instruct the processing device 103 to first transfer (e.g., copy) the originally unlocked/unencoded content 201 from the media storage device 101 to the processing device's memory 121 (assuming the original media storage device 101 is not copy-protected or such protection has been disabled—e.g., via instruction from the server 105) and then transfer the content 201 from memory 121 to the writeable media storage device 132.

Alternatively, if the user's processing device 103 has the capability to read from one media storage device 101 and write to another device 132 (e.g., includes or is coupled to two appropriate drives), then the user may instruct the processing device 103 to write the original, unlocked content 201 directly to the new media storage device 132. The processing device 103 preferably uses commercially available writing software, such as NERO CD burning software or RECORDNOW! CD/DVD burning software, to write the original content files to the new media storage device 132 and finalize the new media storage device 132 for playback. Once the new media storage device 132 has been finalized, the user may remove it from the writer drive and play it in an appropriate standalone media playback device 125.

In yet another embodiment, the standalone media player 125 may be coupled to the wide area network 117 itself and perform all the functions of the processing device 103. For example, the standalone media player 125 may be implemented as a computer, or vice versa. Still further, the standalone media player 125 may be alternatively used as the drive with which to write the newly unlocked content onto a media storage device 132 (e.g., where processing device 103 does not include such capability). In this case, the media player 125 may have a known IP address or network name that may be selected by the processing device 103 as the target device for storage of the unlocked content in accordance with conventional addressing and data transfer techniques.

The present disclosure has widespread application to the sale and distribution of various types of media. For example, with respect to audio media, a user may purchase a music CD containing a music album or an audio CD containing an audio book. The user places the CD in a CD player and plays the album. The user then places the CD into the CD or DVD drive of his or her computer and hears a sample of an entirely different album or book, as applicable. Alternatively, the sample may be heard, for example, at the beginning or end of the CD during normal play in the CD player. If the user is interested in acquiring the second album, the user flips the CD over and reinserts it into the CD/DVD drive of the computer (e.g., assuming the CD/DVD drive of the computer can only read one side of the CD). Upon reading the back side of the CD and executing the software stored thereon, the computer's Internet browser is opened and the computer is automatically directed to a website on a remote server that is related to the sampled content on the CD (e.g., a website of the CD's publisher). Once at the site, the user is prompted to enter his or her payment and other information (e.g., name, address, age, phone number, email address and so forth) to purchase the additional album or book, as applicable. Once the payment information is received, the server sends an appropriate code to the user's computer to decrypt, decode or otherwise unlock the second album/book from the CD and allow the user to store it on the computer's hard drive. The user can then play the new album or book on his or her computer and/or download the album/book onto a writeable CD or DVD to facilitate playback in a standalone fixed or portable CD or DVD player.

As another example, with respect to multimedia (e.g., audio and video) content, a user may purchase a DVD containing a movie. The user places the DVD in a DVD player and plays the movie. The user then places the DVD into the DVD drive of his or her computer and hears a sample of an album related to the DVD (e.g., the soundtrack from the movie). Alternatively, the sample may be heard, for example, at the beginning or end of the DVD during normal play in the DVD player. If the user is interested in acquiring the soundtrack, the user flips the DVD over and reinserts it into the DVD drive of the computer (e.g., assuming the DVD drive of the computer can only read one side of the DVD). Upon reading the back side of the DVD, the computer's Internet browser is opened and the computer is automatically directed to a website on a remote server that is related to the sampled content on the DVD (e.g., a website of the DVD's publisher or the publisher of the soundtrack). Once at the site, the user is prompted to enter his or her payment and other information to purchase the soundtrack. Once the payment information is received, the server sends an appropriate code to the user's computer to decrypt, decode or otherwise unlock the full soundtrack from the DVD and allow the user to store it on the computer's hard drive. The use can then play the newly purchased soundtrack on his or her computer and/or download the soundtrack onto a writeable CD or DVD to facilitate playback in a standalone fixed or portable CD or DVD player.

As a further example, with respect to video or multimedia content, a user may purchase a DVD containing a movie. The user places the DVD in a DVD player and plays the movie. The user then places the DVD into the DVD drive of his or her computer and sees a sample (e.g., trailer) of another movie, which may or may not be related to the movie on the DVD (e.g., a prequel, sequel or other movie). Alternatively, the sample may be viewed, for example, at the beginning or end of the DVD during normal play in the DVD player. If the user is interested in acquiring the sampled movie, the user flips the DVD over and reinserts it into the DVD drive of the computer (e.g., assuming the DVD drive of the computer can only read one side of the DVD). Upon reading the back side of the DVD, the computer's Internet browser is opened and the computer is automatically directed to a website on a remote server that is related to the sampled content on the DVD (e.g., a website of the DVD's publisher). Once at the site, the user is prompted to enter his or her payment and other information to purchase the second movie. Once the payment information is received, the server sends an appropriate code to the user's computer to decrypt, decode or otherwise unlock the second movie from the DVD and allow the user to store it on the computer's hard drive. The user can then play the newly purchased movie on his or her computer and/or download the movie onto a writeable DVD to facilitate playback in a standalone fixed or portable DVD player.

One of ordinary skill in the art will readily recognize that, with respect to the exemplary applications provided above, the supplemental, locked content, whether audio, video or multimedia, may be alternatively stored on the same side of the CD or DVD as is the primary, unlocked content. In this case, when the CD or DVD is placed in the appropriate drive of the computer, the software on the DVD may provide a hyperlink to the website at which the supplemental content can be purchased. If acquisition of the supplemental content is desired, the user selects the hyperlink and is directed to the website for entry of payment and other information as discussed above.

As disclosed above, the present disclosure provides a system for securely providing supplemental media content to a user who has purchased or otherwise legally acquired a media storage device containing primary media content and information relating to the supplemental content. The system enables media content providers to fully utilize the storage capacity of high capacity media storage devices to offer additional content to purchasers of the providers' products, without negatively affecting the providers' profits. By encrypting or otherwise locking the supplemental content, the media content providers mitigate the risk that such content will be misappropriated by consumers. However, by including the additional content on the already purchased storage device and permitting speedy access to the content by simply entering payment information at a website, the present disclosure allows media distributors to benefit from the impulsive nature of consumers. Thus, the present disclosure provides the best of both worlds, prompt content access with secure content retention until purchase.

Figure 3:
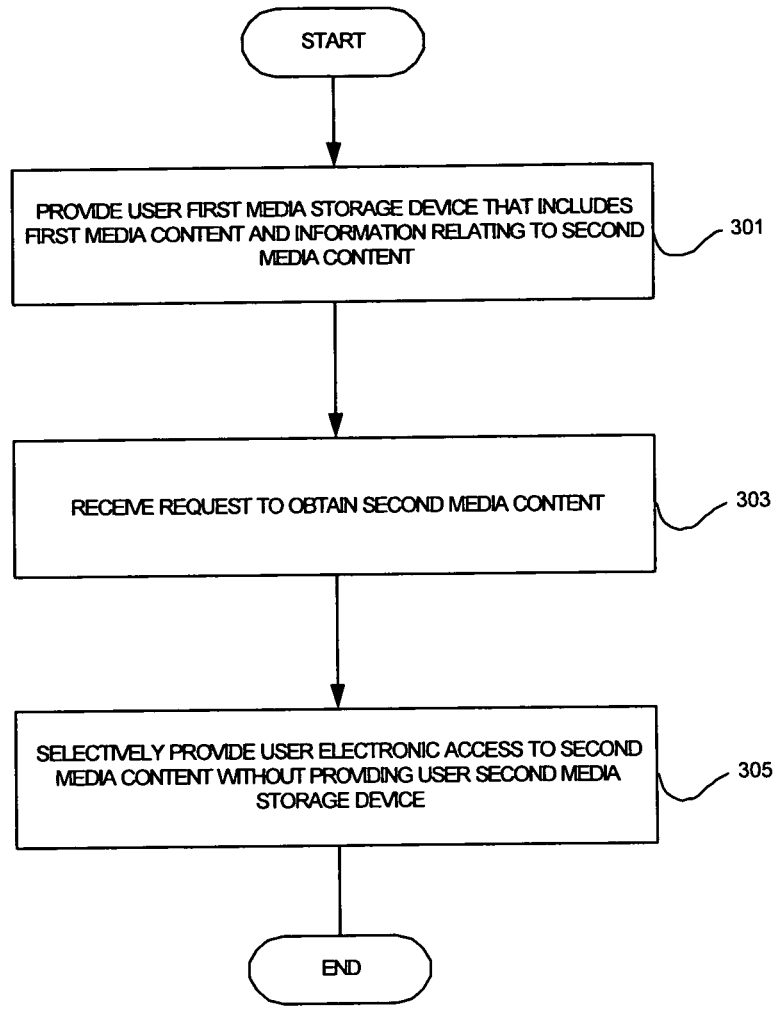
FIG. 3 is a flow diagram of steps generally executed by a media content provider to selectively supply media content to a user in accordance with the present disclosure.
Figure 4:
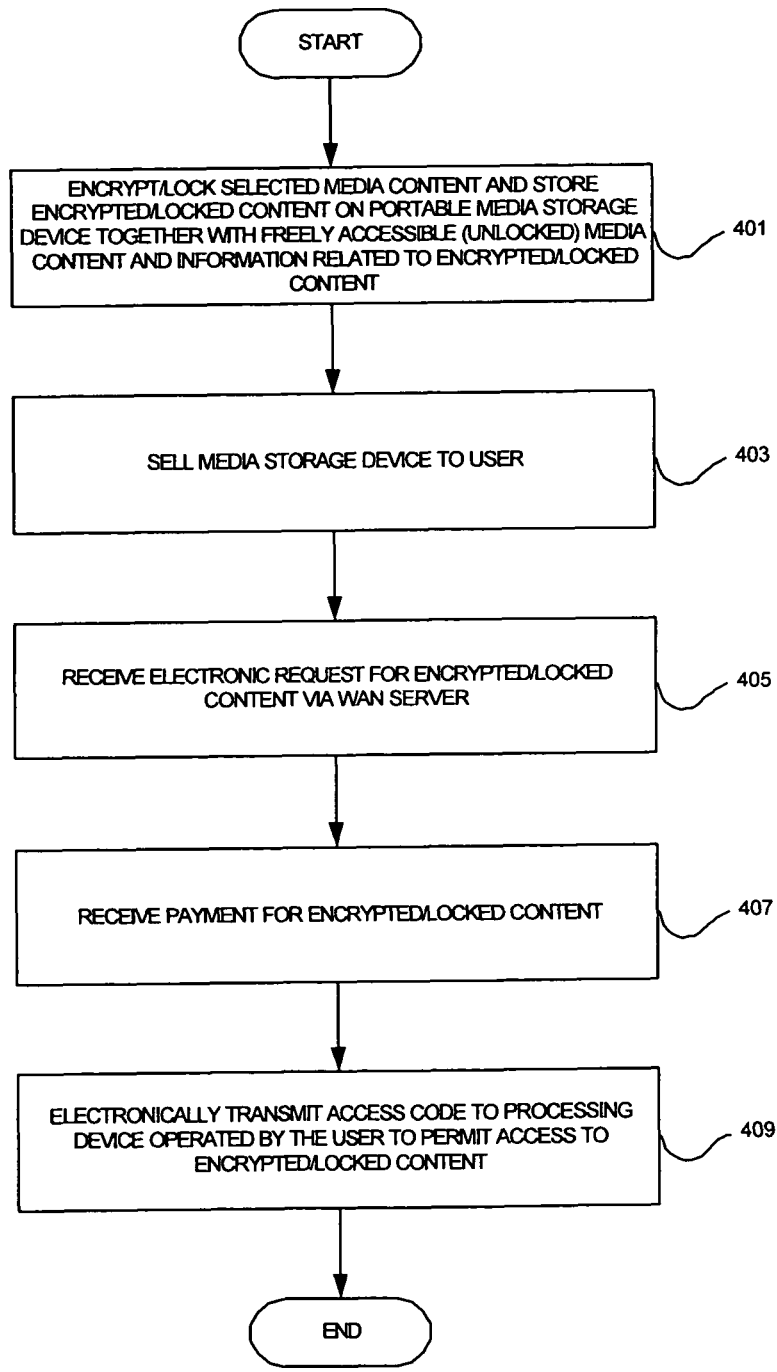
FIG. 4 is a flow diagram of steps executed by a media content provider to selectively supply media content to a user in accordance with a preferred embodiment of the present disclosure.
Figure 5:
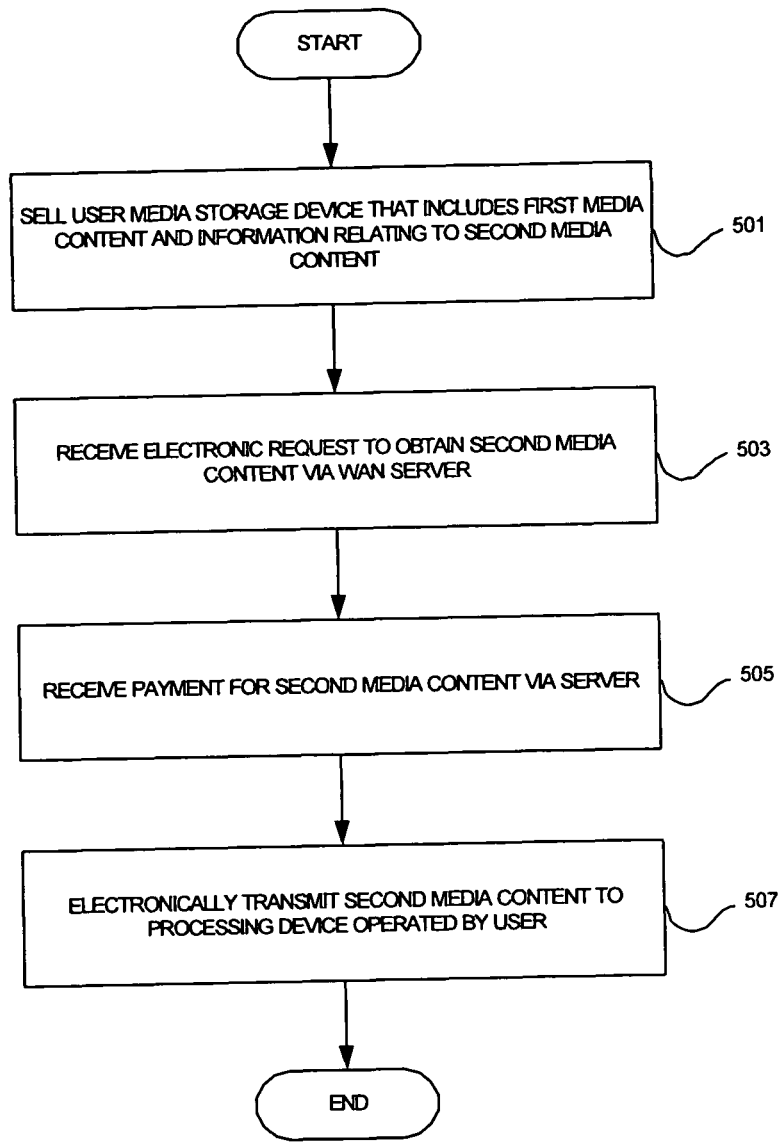
FIG. 5 is a flow diagram of steps executed by a media content provider to selectively supply media content to a user in accordance with an alternative embodiment of the present disclosure.

FIG. 3 is a flow diagram of steps generally executed by a media content provider to selectively supply media content to a user in accordance with the present disclosure. As used herein, the term "media content provider" means any entity involved in the distribution of any form of media, including, without limitation, publishers, wholesalers, distributors, retailers, rental companies, and their agents and licensees. For purposes of the present disclosure, the logic flow begins when the media content provider provides (301) the user with a first media storage device (e.g., a DVD or CD) that includes first media content (e.g., a movie or album) and information relating to second or supplemental media content (e.g., a movie trailer or music). The first media storage device may be supplied to the user directly or through a distribution channel by sale, lease, or any other means of distribution. The first media storage device may also be distributed to the user free of charge.

Some time after providing the first media storage device to the user, the media content provider receives (303) a request from the user (e.g., electronically, orally or otherwise) to obtain (e.g., purchase or lease) the supplemental media content advertised on the first media storage device. Responsive to the request, the media content provider selectively provides (305) the user electronic access to the supplemental media content without providing the user another media storage device. In other words, the user need not obtain any other media storage device from the media content provider to enjoy the supplemental media content. In a preferred embodiment, the selectivity involved in providing the supplemental media content to the user generally includes receiving appropriate payment and other information from the user to insure that a purchase price has been paid by the user for the supplemental content prior to distributing the supplemental content to the user. Two more detailed, exemplary embodiments for supplying supplemental content to a user in accordance with the present disclosure are discussed below with respect to FIGS. 4 and 5.

Pursuant to the first exemplary and preferred embodiment of the present disclosure, the media content provider encrypts or otherwise locks (401) selected media content and stores (401) the locked content on a portable media storage device (e.g., a CD, DVD, or other optical disk) together with freely accessible or unlocked media content and information related to the locked content. In other words, the media content provider produces a CD, DVD, or other media storage device that includes both locked content and unlocked content. In a preferred embodiment in which the media storage device is a CD or DVD configured to accept storage of data on both sides of the device, the unlocked content is stored on one side of the device and the locked content is stored on the other side of the device. Alternatively, the locked and unlocked content may be stored on the same side of the device or simply in different portions of the device, particularly where the media storage device is not side-oriented (e.g., storage device is a memory stick, SDC, CompactFlash memory, or microdrive as opposed to a CD or DVD). Still further, the unlocked media content and the information related to the locked media content may be embodied in different media. For example, the unlocked media content may be resident as one or more video or audio files stored on the media storage device; whereas, the information related to the locked content maybe placed in the advertising on the cover or in the other documentation of the media storage device. Thus, as noted above, the term "media storage device" includes the actual storage media on which digital content is stored together with all documentation accompanying the media at the point of sale or lease.

The media content provider sells (403) the media storage device to the user either directly or through its distribution channel. Some time after the sale (e.g., after the user has had time to review at least the information related to the locked content), the media content provider receives (405) an electronic request for the locked content at a wide area network server operated by, on behalf of, or at least in conjunction with the media content provider. In the preferred embodiment, the media content provider receives such request at the provider's Internet website (e.g., as a result of the user's selection of a hyperlink stored on the media storage device or on the content provider's website). In addition to receiving the acquisition request, the media content provider also receives (407) payment for the locked content (e.g., through entry of the user's credit card and other personal information at a secure portion of the content provider's website). After receiving payment, the media content provider electronically transmits (409) an access code to a processing device (e.g., computer) operated by the user to permit the user to access the locked content. The access code preferably comprises a software application that enables the user's processing device to decrypt and read the locked content using an appropriate encryption key and algorithm. If the media storage device permits storage and finalization of the device, the access code also preferably instructs the processing device to restore the newly unlocked content on the media storage device to facilitate subsequent playback of, or other access to, the content by any appropriate processing device selected by the user (e.g., a computer or a standalone playback device configured to permit playback of the particular media storage device).

A primary benefit of this embodiment of the present disclosure is that it strikes a balance between the risk of misappropriation of the supplemental content and use of the full data storage capacity of the media storage device. Risk of misappropriation is substantially mitigated through encryption of the content on the storage device, while inclusion of the additional content on the storage device utilizes the device's storage capacity in an attempt to exploit the impulsive nature of consumers.

Pursuant to the second exemplary embodiment by which a media content provider may supply supplemental content to a user in accordance with the present disclosure, the media content provider sells or leases (501) the user a media storage device that includes first media content (e.g., a movie) and information relating the second or supplemental media content (e.g., a movie trailer or soundtrack sample). Some time after the sale or lease, the media content provider receives (503) an electronic request for the supplemental content from the user at a wide area network server (e.g., the media content provider's Internet website). The media content provider also receives (505) payment for the supplemental content at the server. Thereafter, in contrast to the embodiment disclosed above with respect to FIG. 4, the media content provider electronically transmits (507) the supplemental media content to a processing device (e.g., computer) operated by the user. The supplemental content may originate from the server at which the media content provider received payment or from another server authorized by the media content provider to transfer the supplemental content to the user. In this embodiment, the supplemental content has not been pre-stored on the media storage device. A primary benefit of this embodiment is that the supplemental content is only ever distributed after receipt of payment, thereby minimizing any risk of misappropriation. On the other hand, this embodiment may not permit the media content provider to make full use of the data storage capacity of the media storage device.

Once received by the user, the user may review the new content on the processing device that received it. Alternatively, if the content is transmitted in a format that can be stored on a portable storage device, the user may store the content on the portable media storage device (which device may be the media storage device containing the first media content if such device permits storage of additional content thereon) for later review or playback by any processing device that can read the content from the portable storage device.

Figure 6:
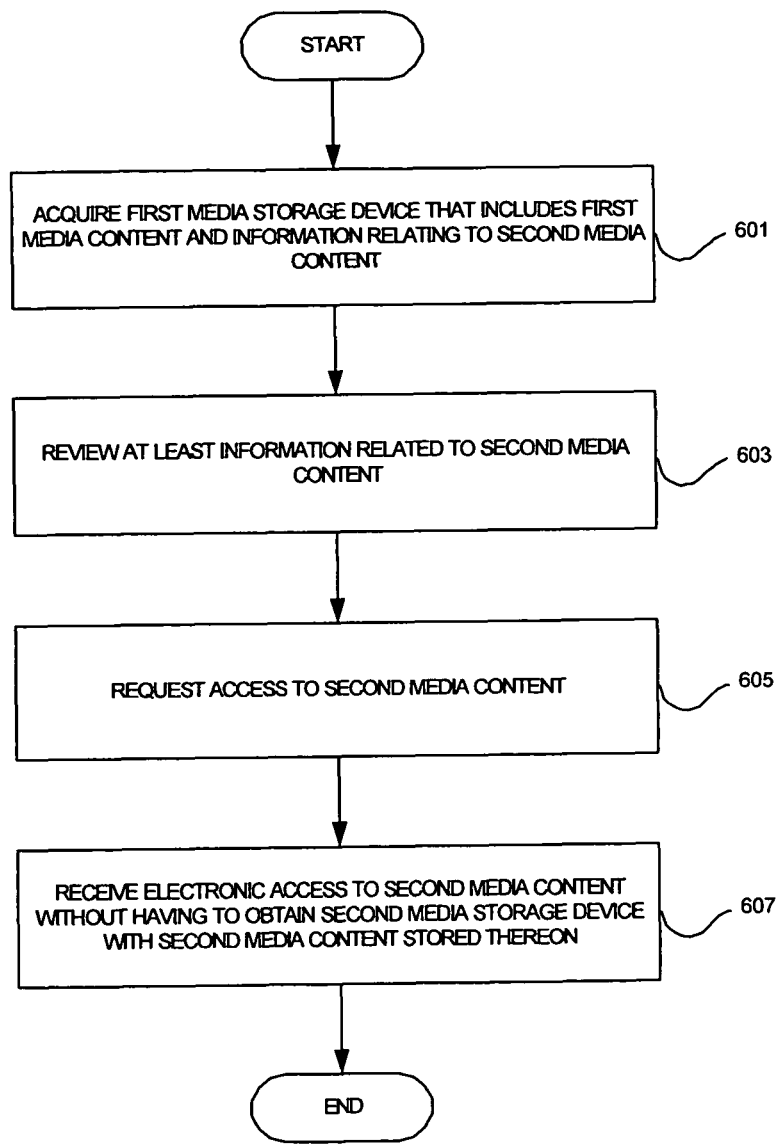
FIG. 6 is a flow diagram of steps generally executed by a user to acquire media content from a media content provider in accordance with the present disclosure.
Figure 7:
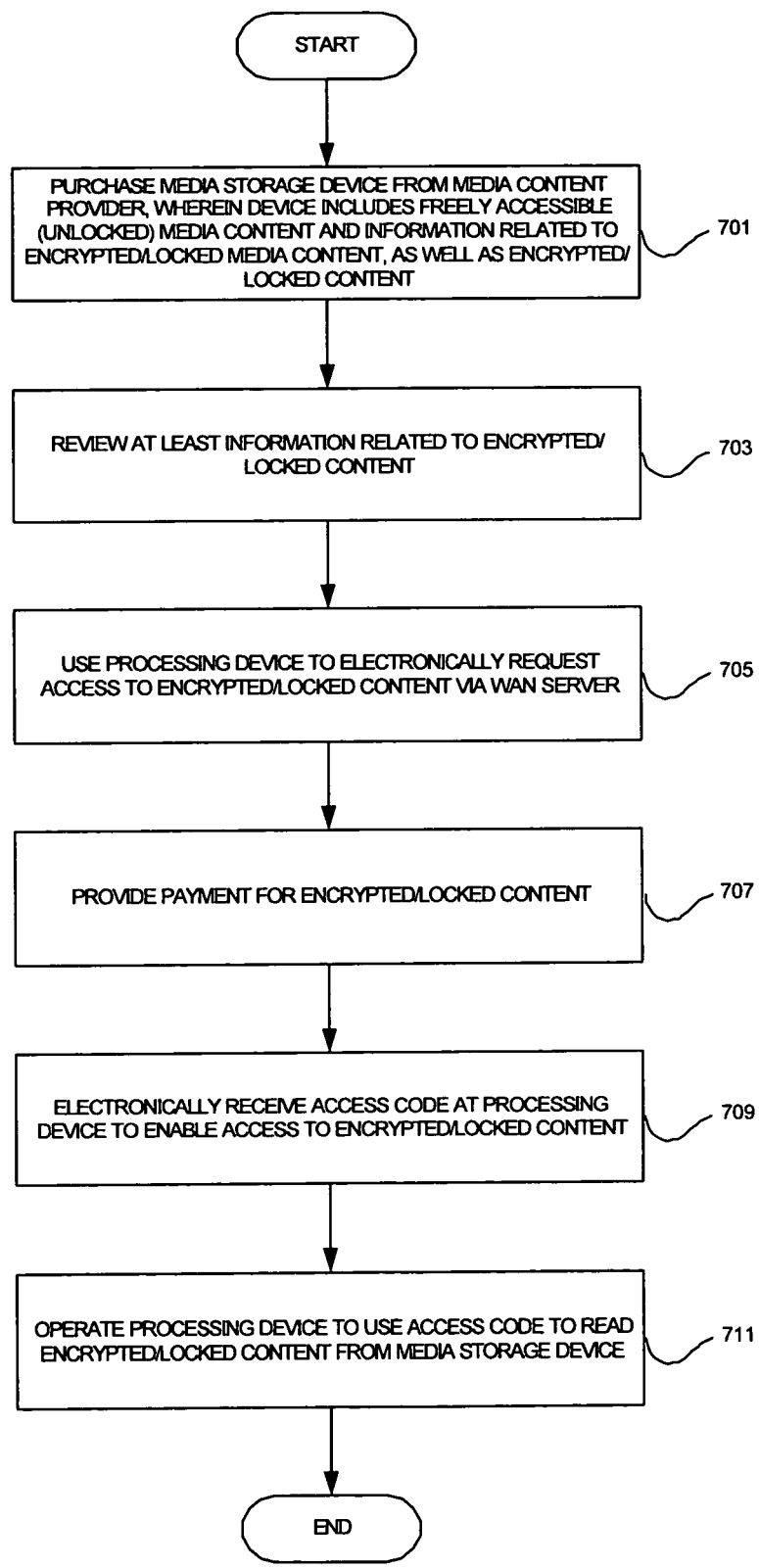
FIG. 7 is a flow diagram of steps executed by a user to acquire media content from a media content provider in accordance with a preferred embodiment of the present disclosure.
Figure 8:
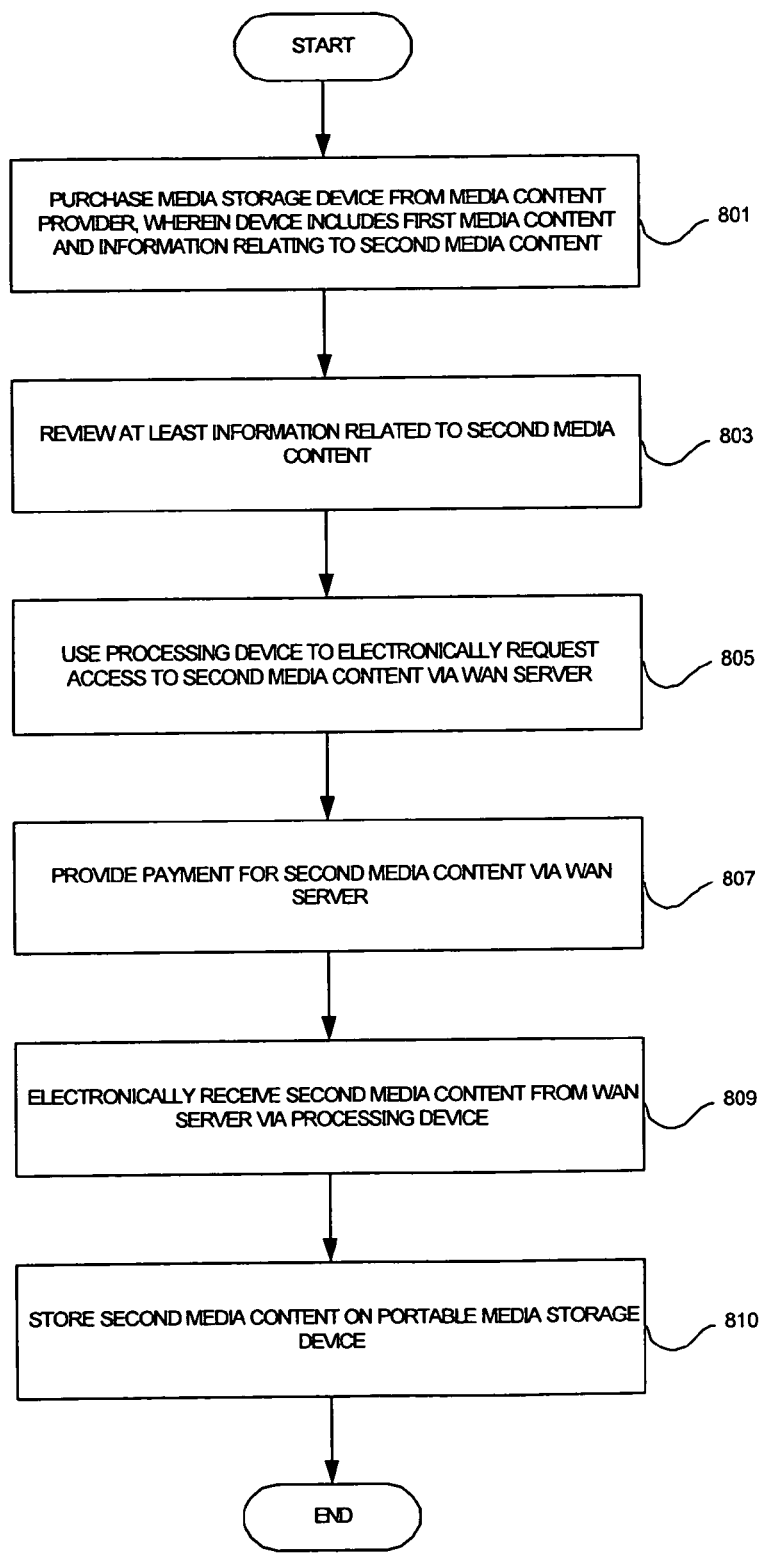
FIG. 8 is a flow diagram of steps executed by a user to acquire media content from a media content provider in accordance with an alternative embodiment of the present disclosure.

FIG. 6 is a flow diagram of steps generally executed by a user to acquire media content from a media content provider in accordance with the present disclosure. For purposes of the present disclosure, the logic flow begins when the user acquires (601), via purchase, lease or other distribution, a media storage device from a media content provider, wherein the media storage device (e.g., a CD) includes first media content (e.g., a music album) and information related to second or supplemental media content (e.g., samples from another music album by the same artist or samples from another album published by the media content provider). The user then reviews (603) at least the information related to the supplemental media content and, more preferably, the first media content. If the user decides to acquire (e.g., by purchase or lease) the supplemental content, the user contacts the media content provider and requests (605) access to the supplemental content. Such a request is preferably made electronically over a wide area network, such as the Internet, from a processing device operated by the user. Alternatively, the request may be made orally by phone, videophone, or any other suitable means.

Responsive to the request, the user receives (607) electronic access to the supplemental media content without having to obtain another media storage device having the supplemental content stored thereon. In other words, as noted above with respect to FIG. 3, the user need not obtain any other media storage device from the media content provider to enjoy the supplemental media content. Rather, the supplemental content is preferably made available to the user via transmissions over the wide area network. In a preferred embodiment, the process involved in receiving the supplemental content generally includes providing appropriate payment and other information to the media content provider to pay the purchase or lease price associated with the supplemental content prior to actually receiving the supplemental content from the media content provider. Two more detailed, exemplary embodiments for acquiring supplemental content from a media content provider in accordance with the present disclosure are discussed below with respect to FIGS. 7 and 8.

Pursuant to the first exemplary and preferred embodiment of the present disclosure, the user purchases or leases (701) a media storage device that includes freely accessible (i.e., unlocked) media content and information related to additional locked content, as well as the locked content. The locked content is preferably encrypted using conventional encryption algorithms. In other words, the media storage device acquired by the user includes prestored locked content and unlocked content, as well as information (e.g., an advertisement) to advise the user as to the potential availability of the locked content for purchase or lease. The user may acquire the media storage device from the media content provider either directly or through the provider's distribution channel.

In a preferred embodiment in which the media storage device is a CD or DVD configured to accept storage of data on both sides of the device, the unlocked content is stored on one side of the device and the locked content is stored on the other side of the device. Alternatively, the locked and unlocked content may be stored on the same side of the device or simply in different portions of the device, particularly where the media storage device is not side-oriented (e.g., storage device is a memory stick, SDC, CompactFlash memory, or microdrive as opposed to a CD or DVD). Still further, the unlocked media content and the information related to the locked media content may be embodied in different media. For example, the unlocked media content may be resident as one or more video or audio files stored on the media storage device; whereas, the information related to the locked content may be located in the advertising on the cover or in the other documentation of the media storage device. Thus, as noted above, the media storage device includes the actual storage media on which digital content is stored together with all documentation accompanying the media at the point of sale or lease.

Some time after acquisition of the media storage device, the user reviews (703) at least the information related to the locked content, although preferably also reviews all the unlocked content on the device. If the user desires to acquire the locked content, the user uses (705) a processing device (e.g., a computer connected to a wide area network, such as the Internet) to electronically request access to the locked content via a server coupled to a wide area network. In the preferred embodiment, the user makes such request at an Internet website operated by, on behalf of, or at least in conjunction with the media content provider or other provider of the locked content. In addition to, or as part of, requesting access to the locked content, the user provides (707) payment for the locked content (e.g., through entry of the user's credit card and other personal information at a secure portion of the content provider's website). After providing payment, the user electronically receives (709) an access code at the user's processing device to enable access to the locked content. As noted above, the access code preferably comprises a software application that enables the user's processing device to decrypt and read the locked content using an appropriate encryption key and algorithm. If the media storage device permits storage and finalization of the device, the access code preferably instructs the processing device to restore the newly unlocked content on the media storage device to facilitate subsequent playback of, or other access to, the content by any appropriate processing device selected by the user (e.g., a computer or a standalone playback device, such as an optical disc reading device (e.g., DVD or CD player), configured to permit playback of the particular media storage device). Alternatively, the access code may include a password, passcode, or other information necessary to access the locked content.

After receiving the access code, the user preferably operates (711) the processing device as necessary to use the access code to read or retrieve the locked content from the media storage device. Such operation may be as simple as leaving the processing device powered on and booted up so that the processing device can process the access code automatically pursuant to its instructions or may include performing certain operations (e.g., selecting a hyperlink using a mouse or entering a password using a keyboard) as instructed by the media content provider to use the access code to access the locked content. Once the new content is acquired, the user may store the new content in processing device memory (e.g., on a hard disc), on the media storage device (if so permitted), or on another media storage device, depending on the limitations imposed by the media content provider and the capabilities of the available media storage devices.

Pursuant to the second exemplary embodiment by which a user may acquire supplemental content from a media content provider in accordance with the present disclosure, the user purchases or leases (801) a media storage device from the media content provider, wherein the storage device includes first media content (e.g., a movie) and information relating the second or supplemental media content (e.g., a movie trailer or soundtrack sample). Some time after acquiring the media storage device, the user reviews (803) at least the information (e.g., advertising) related to the supplemental content, although preferably also reviews all the unlocked content on the device. If the user desires to acquire the supplemental content, the user uses (805) a processing device (e.g., a computer appropriately connected to the Internet) to electronically request access to the supplemental content via a server (e.g., an Internet website server) operated by, on behalf of, or at least in conjunction with the media content provider or other provider of the supplemental content. In addition to, or as part of, requesting access to the locked content, the user provides (807) payment for the supplemental content via the server (e.g., through entry of the user's credit card and other personal information at a secure portion of the content provider's website).

After providing payment, the user electronically receives (809) the supplemental content at the user's processing device via the wide area network. The supplemental content may have been sent by the server contacted by the user, or another server at which the supplemental content is stored at least for purposes of electronic distribution in accordance with the present disclosure. The supplemental content is preferably in a format that is storable on a portable or removable media storage device to thereby permit the user to transfer the content to a preferred processing device (e.g., computer or standalone media player) for playback.

After receiving the supplemental content, the user optionally stores (810) the content on a portable media storage device, which device may be the original media storage device acquired from the media content provider provided that such media storage device is configured to permit storage of additional content. Thus, in contrast to the embodiment disclosed above with respect to FIG. 7, the user electronically receives the supplemental media content from the media content provider's website or other authorized server rather than unlocking it or having it unlocked from the media storage device. That is, in this embodiment, the supplemental content has not been prestored on the media storage device.

The present disclosure encompasses a method and system for selectively supplying media content to a user, as well as a media storage device for use in such a system. With this disclosure, media content providers can use the full storage capabilities of existing and future digital storage mediums to place in consumers' hands additional content for purchase, without substantially risking the misappropriation of such content. Alternatively, where the provision of encrypted or otherwise locked content is still considered too risky, the present disclosure facilitates the advertising of additional content on a media storage device and the electronic acquisition of such additional content from a remote server after receipt of payment. In either embodiment, the present disclosure allows acquisition of primary and supplemental media content upon payment for each such content, while only requiring the user to acquire a single media storage device containing the primary content. Thus, the present disclosure allows users to minimize the quantity of media storage devices that must be maintained to enjoy various media content. Further, the present disclosure provides for storage of secondarily acquired media content on the same commercially purchased or leased media storage device as is stored primary media content and advertising for the secondary media content. Thus, the present disclosure facilitates the storage of newly acquired content on commercially burned media storage devices (e.g., pre-burned DVDs and CDs), in sharp contrast to the prior art approach of requiring users to purchase or rent a separate DVD and/or to obtain additional content.

In the foregoing specification, the present disclosure has been described with reference to specific embodiments. However, one of ordinary skill in the art will appreciate that various modifications and changes may be made without departing from the spirit and scope of the present disclosure as set forth in the appended claims. For example, more than just one type of supplemental content (e.g., an additional movie and a soundtrack, multiple additional movies or albums (e.g., the two additional movies of a trilogy), and so forth) may be prestored in locked form on the media storage device to allow the user to purchase or lease all such supplemental content. Alternatively, multiple types of media content may be advertised on the media storage device and thereafter available for purchase from the media content provider's or other authorized server or website. Accordingly, the specification and drawings are to be regarded in an illustrative rather than a restrictive sense, and all such modifications are intended to be included within the scope of the present disclosure and the appended claims.

Benefits, other advantages, and solutions to problems have been described above with regard to specific embodiments of the present disclosure. However, the benefits, advantages, solutions to problems, and any element(s) that may cause or result in such benefits, advantages, or solutions to become more pronounced are not to be construed as a critical, required, or essential feature or element of any or all the claims. As used herein and in the appended claims, the terms "comprises," "comprising" or any other variation thereof is intended to refer to a non-exclusive inclusion, such that a process, method, apparatus, or article of manufacture that comprises a list of elements does not include only those elements in the list, but may include other elements not expressly listed or inherent to such process, method, apparatus, or article of manufacture. All terms used in the appended claims that are not otherwise specifically defined herein should be accorded their ordinary meanings.

I claim:

1. A method for supplying media content to a user, the method comprising:

storing first media content and information relating to second media content on a first media storage device, wherein the first media content and the information relating to the second media content are accessible from the first media storage device without use of a code;

receiving, at a first server, a request from the user to obtain the second media content;

encrypting at least part of the second media content to produce encrypted content, wherein the second media content comprises video content having a plurality of data files, wherein the plurality of data files includes content files and menu files, and wherein the encrypting at least part of the second media content comprises encrypting at least the menu files;

responsive to the request, providing electronic access to the second media content wherein providing electronic access includes transmitting the second media content to the first media storage device so that the second media content becomes freely accessible from the first media storage device without use of a code.

2. The method of claim 1, wherein the second media content is accessed by a processing device that comprises a standalone DVD player, a standalone CD player, or a standalone MP3 player.

3. The method of claim 1, wherein a software application enables a processing device to store the second media content on a second media storage device so as to facilitate subsequent access to the second media content by at least one of the processing device and a second processing device.

4. The method of claim 1, further comprising:
receiving consideration for the second media content; and
responsive to receiving the consideration, electronically transmitting the second media content to a processing device of a user.

5. The method of claim 4, wherein the consideration comprises at least payment of a purchase price of the second media content.

6. The method of claim 4, wherein the consideration comprises personal information of a user.

7. The method of claim 4, wherein the personal information comprises at least one of demographic information and psychographic information.

8. The method of claim 7, wherein receiving consideration for the second media content comprises receiving the consideration electronically via the first server, wherein the first server is connected to a wide area network.

9. The method of claim 1, wherein supplying the first media storage device comprises selling the first media storage device to a user directly or through a distribution channel.

10. The method of claim 1, wherein the first media storage device is distributed free of charge.

11. The method of claim 1, wherein receiving the request to obtain the second media content comprises receiving an electronic request for the second media content at the first server, wherein the first server is connected to a wide area network.

12. The method of claim 11, wherein the second media content is stored on a second server, and further comprising:
receiving consideration for the second media content at the first server; and
responsive to receiving the consideration, electronically transmitting the second media content from the second server to a processing device of a user.

13. The method of claim 12, wherein the second media content is electronically transmitted to the processing device in a format that is storable on a portable media storage device.

14. The method of claim 13, wherein the portable media storage device comprises the first media storage device.

15. The method of claim 1, wherein the second media content includes digital rights management software to mitigate unauthorized duplication of the second media content after electronic access thereto has been provided.

16. The method of claim 1, further comprising
separating the second media content into the plurality of data files;

17. The method of claim 1, wherein the encrypting comprises encrypting the plurality of data files as a single group to produce the encrypted content.

18. The method of claim 1, wherein the encrypting comprises encrypting the content files.

19. A method for storing media content on a portable storage device, the method comprising:
storing first media content and information related to second media content in a first portion of the portable storage device so that the first media content and information related to the second media content are freely accessible upon acquisition of the portable media storage device without use of a code;
encrypting at least a portion of the second media content to produce encrypted content, wherein the second media content comprises video content having a plurality of data files, wherein the plurality of data files includes content files and menu files, and wherein the encrypting at least the portion of the second media content comprises encrypting at least the menu files; and
storing the encrypted content in a second portion of the portable storage device, wherein the encrypted content remains inaccessible until the second media content is unlocked so that the second media content becomes freely accessible from the portable media storage device without use of a code.

20. The method of claim 19, wherein the portable media storage device comprises an optical disk, wherein storing the first media content comprises storing the first media content on a first side of the optical disk, and wherein storing the encrypted content comprises storing the encrypted content on a second side of the optical disk.

21. The method of claim 19, further comprising
separating the second media content into the plurality of data files.

22. The method of claim 19, wherein encrypting at least the portion of the plurality of data files comprises encrypting the plurality of data files as a single group to produce the encrypted content.

23. The method of claim 21, further comprising encrypting the content files.

24. A system for supplying media content, the system comprising:
a first media storage device configured to include first media content and information relating to second media content, wherein the first media content and the information relating to the second media content are accessible from the first media storage device without use of a code; and
a server accessible over a wide area network that:
encrypts at least a portion of the second media content to produce encrypted content, wherein the second media content comprises video content having a plurality of data files, wherein the plurality of data files includes content files and menu files, and wherein encryption of at least the portion of the second media content comprises encryption of at least the menu files; and
provides electronic access to the second media content by transmitting the second media content to the first media storage device so that the second media content becomes accessible from the first media storage device without use of a code.

25. The system of claim 24, wherein the first media storage device is configured to store second media content in locked form on the first media storage device.

26. The system of claim 25, wherein the first media storage device is configured to store the first media content on a first side of the first media storage device and the second media content on a second side of the first media storage device.

27. A device, comprising:
a media storage device configured to store first media content and second media content,
wherein the first media content is freely accessible upon acquisition of the media storage device without use of a code; and
wherein the second media content that is stored on the media storage device in an encrypted form, wherein the second media content comprises video content having a plurality of data files, wherein the plurality of data files includes content files and menu files, and wherein at least the menu files are in the encrypted form, wherein information related to the second media content is accessible upon acquisition of the media storage device without use of a code, and wherein upon request the second media content is unlocked on the media storage device so that the second media content becomes accessible from the media storage device without use of a code.

28. The device of claim 27, wherein the first media content is stored on a first side of the media storage device and the second media content is stored on a second side of the media storage device.

29. The device of claim 27, wherein the content files are also in the encrypted form.

30. A system comprising:
a memory configured to store media content data; and
a processor operatively coupled to the memory and configured to:
store first media content and information related to second media content in a first portion of a portable storage device so that the first media content and information related to second media content are freely accessible upon acquisition of the portable media storage device without use of a code;
encrypt at least a portion of the second media content to produce encrypted content, wherein the second media content comprises video content having a plurality of data files, wherein the plurality of data files includes content files and menu files, and wherein encryption of at least the portion of the second media content comprises encryption of at least the menu files; and
store the encrypted content in a second portion of the portable storage device, wherein the encrypted content remains inaccessible until the second media content is unlocked so that the second media content becomes freely accessible without use of a product code.

31. The system of claim 30, wherein the processor is further configured to:
read the second media content from the portable storage device; and
restore the second media content on the first media storage device so as to facilitate subsequent access to the second media content by a plurality of processing devices.

* * * * *

UNITED STATES PATENT AND TRADEMARK OFFICE
CERTIFICATE OF CORRECTION

| | | |
|---|---|---|
| PATENT NO. | : 8,504,652 B2 | Page 1 of 1 |
| APPLICATION NO. | : 11/400889 | |
| DATED | : August 6, 2013 | |
| INVENTOR(S) | : Rothschild | |

It is certified that error appears in the above-identified patent and that said Letters Patent is hereby corrected as shown below:

In the Specification:

In Column 4, Lines 41-52, delete "100211 By selectively supplying media content in this manner, the present disclosure enables media content providers to more readily supply users with media content responsive to the impulsive needs of their customers, while mitigating the likelihood that unauthorized copies of the content will be obtained and distributed. In addition, the present disclosure enables media content providers to take advantage of the increasing data storage capacities of current and future portable media storage devices to prestore various content on a single device, while limiting access to the content until appropriate payment has been received." and
insert -- By selectively supplying media content in this manner, the present disclosure enables media content providers to more readily supply users with media content responsive to the impulsive needs of their customers, while mitigating the likelihood that unauthorized copies of the content will be obtained and distributed. In addition, the present disclosure enables media content providers to take advantage of the increasing data storage capacities of current and future portable media storage devices to prestore various content on a single device, while limiting access to the content until appropriate payment has been received. -- as a new paragraph at Line 42.

In Column 6, Line 23, delete "bup files)." and insert -- .bup files). --, therefor.

In Column 7, Line 40, delete "content" and insert -- content. --, therefor.

In Column 7, Line 50, delete "processing device 203" and insert -- processing device 103 --, therefor.

In Column 10, Line 2, delete "use" and insert -- user --, therefor.

In the Claims:

In Column 17, Line 45, in Claim 16, delete "files;" and insert -- files. --, therefor.

Signed and Sealed this
Twenty-fifth Day of March, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,504,652 B2 | Page 1 of 1 |
| APPLICATION NO. | : 11/400889 | |
| DATED | : August 6, 2013 | |
| INVENTOR(S) | : Leigh M. Rothschild | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1256 days.

Signed and Sealed this
Nineteenth Day of May, 2015

Michelle K. Lee
*Director of the United States Patent and Trademark Office*